March 17, 1959
M. P. SCHREINER
2,878,359
GAS SOLDERING TOOL
Filed May 24, 1957
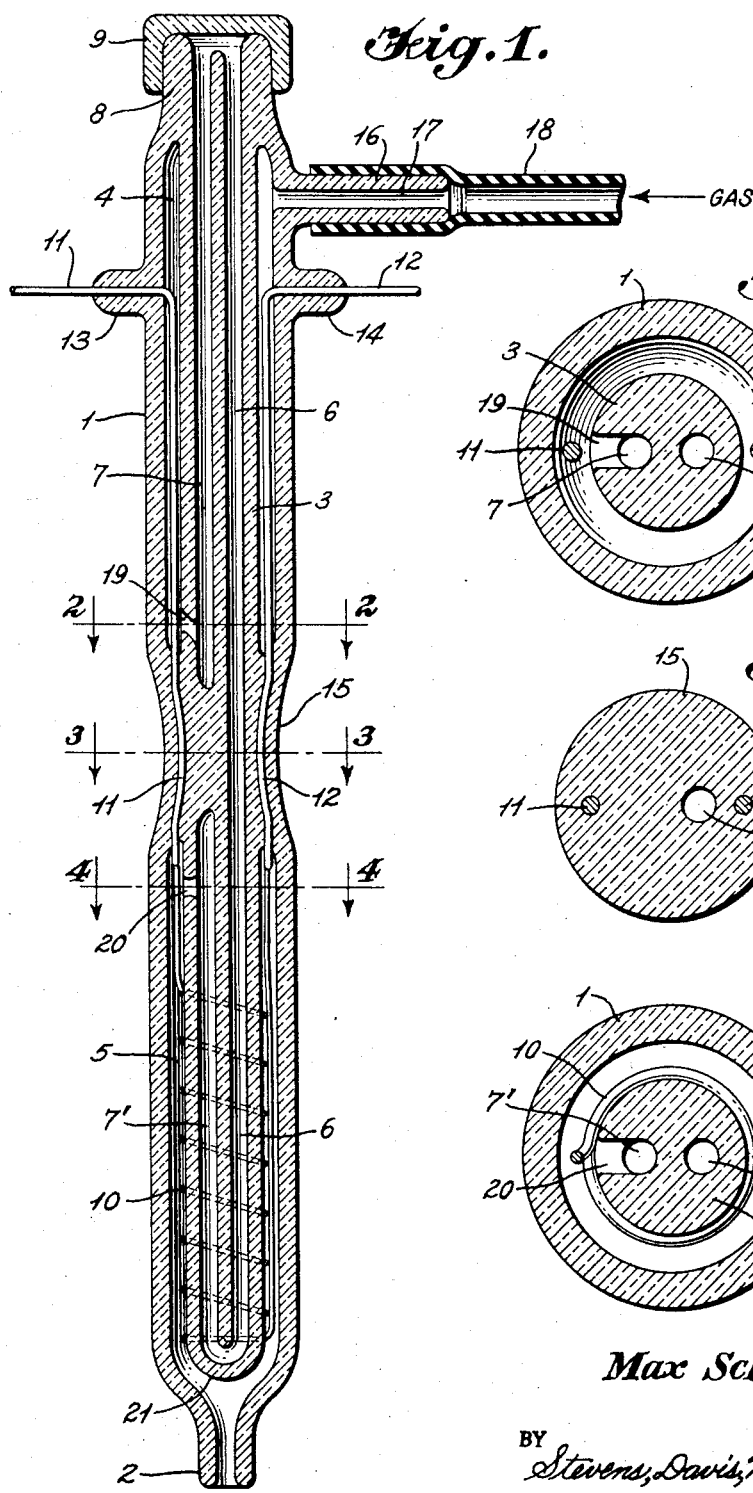
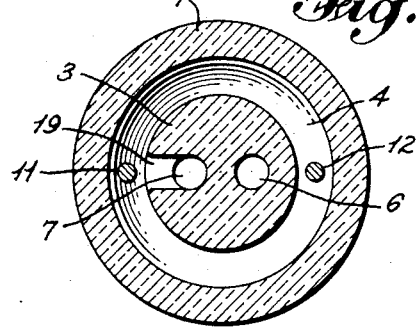
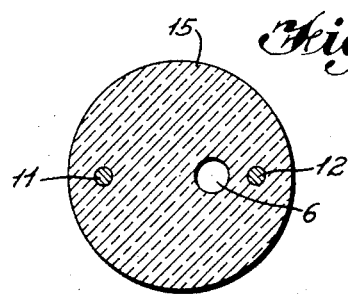
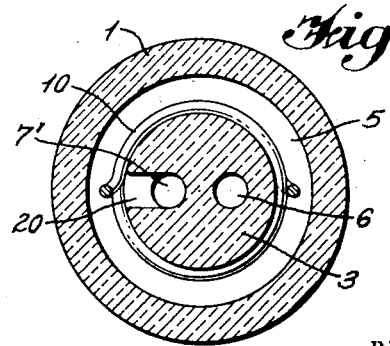
INVENTOR
Max Schreiner
BY
Stevens, Davis, Miller & Mosher
ATTORNEYS

United States Patent Office 2,878,359
Patented Mar. 17, 1959

2,878,359
GAS SOLDERING TOOL

Max P. Schreiner, Dallas, Tex., assignor to Texas Instruments Incorporated, Dallas, Tex., a corporation of Delaware Application May 24, 1957, Serial No. 661,471

8 Claims. (Cl. 219—26)

The present invention relates to soldering tools and, more particularly, to a soldering tool which permits the direction of a hot stream of gas to a predetermined location for the purpose of soldering or fusing certain materials at this location.

Most soldering tools employed in present day use are constructed of a soldering end or tip (which is generally a relatively large mass of metal), a handle portion, and a relatively long shank portion connecting the handle with the tip. The latter portion, which may be heated by a flame or by an electrical means embedded therein, is generally relatively heavy, which makes manipulation of the soldering tool somewhat cumbersome. In addition, it is usually necessary to make the shank portion relatively long so that the handle portion will not become unduly heated. This latter arrangement further adds to the difficulty of manipulating the soldering tool, since the moment arm from the tip to the handle becomes relatively long.

The present invention overcomes both of the above disadvantages of the present day soldering tool by employing a soldering tool which is light-weight in construction, and wherein the handle portion is proximate to the hot end of the tool. As will appear hereinafter, the instant soldering tool is constructed of hollow quartz, heat resistant glass or similar material; the soldering is effected by a hot stream of gas which emerges from the tip of the tool to be directed against the material to be soldered. The passageways in the interior of this soldering tool are so arranged and designed that the gas, in passing through the tool, cools the handle portion thereof and is then heated at the opposite end of the tool to be used as the hot gas stream for soldering.

Therefore, it is a principal object of this invention to provide a soldering tool which is light-weight in construction and, therefore, easy to manipulate.

It is a further object of this invention to provide a soldering tool which permits the direction of a hot stream of gas against the points or materials to be soldered or fused.

It is a still further object of this invention to provide a soldering tool in which the handle portion is relatively close to the hot tip of the tool.

It is a still further object of this invention to provide a soldering tool of the type referred to above wherein the gaseous stream passing therethrough keeps the handle portion relatively cool.

Other and further objects and advantages features of this invention will hereinafter more fully appear from a detailed description of the drawings wherein:

Figure 1 is a longitudinal cross-sectional view (on a somewhat larger scale than is actually employed) of a gas soldering tool constructed in accordance with the present invention.

Figure 2 is a transverse cross-sectional view (on an enlarged scale) taken along section line 2—2 of Figure 1.

Figure 3 is a transverse cross-sectional view (on an enlarged scale) taken along section line 3—3 of Figure 1.

Figure 4 is a transverse cross-sectional view (on an enlarged scale) taken along section line 4—4 of Figure 1.

Referring to the drawings in detail, in Figures 1 to 4 there is shown a hollow and substantially cylindrical outer tube 1 of quartz of similar material, the lower end of which is shown as a relatively narrow opening or tip 2 from which the hot gas emerges. Concentrically arranged within the outer tube 1 is a somewhat narrower rod 3 also of quartz or similar material, which rod defines with the outer tube 1 an annular zone 4 at the upper end of the tool and another annular zone 5 at the lower end thereof. The inner rod 3 is provided with a pair of spaced longitudinally extending holes 6 and 7 which extend for substantially the entire length of the rod 3, except as hereinafter indicated.

At the upper end of the gas soldering tool, as indicated at 8, the inner rod 3 is fused to the outer tube 1 so as to provide an upper terminus for the annular zone 4. A quartz cap 9 or cap of material similar to that of tube 1 is fused to the upper end of the gas soldering tool to close off the same, but in such a manner as to permit communication between holes 6 and 7 at their upper ends, as shown in Figure 1.

Surrounding the lower end of the inner rod 3 is a coil of resistance wire 10, which is preferably 20 mil Nichrome wire. A pair of lead wires 11 and 12 of somewhat larger size, for example 40 mils, and of somewhat lower resistivity material, such as, for example, copper, extend upwardly from the coil 10 and out of the soldering tool at fused joints 13 and 14, respectively.

Substantially midway of the soldering tool as generally indicated at 15, the outer quartz tube has been fused to the inner rod 3 so as to prevent communication between the upper annular zone 4 and the lower area 5. As shown in Figure 3, this fused joint 15 also seals into position the lead wires 11 and 12 described above. With regard to the niner quartz tube 3 itself, at the location of the fused joint 15, this tube has been fused at one side thereof so as to block off the hole 7, forming a separate lower portion 7' of this hole. Therefore, as shown in Figure 3, the only passageway leading through this fused joint 15 is the hole 6.

At the upper end of the soldering tool, a right-angled connection 16 having a lateral opening 17 permits communication with the upper annular zone 4. A length of rubber tubing 18, or other suitable fluid conducting means, may be received on the connection 16 to permit the introduction of a suitable inert gas, such as helium, into the annular zone 4.

At the lower end of the annular zone 4, adjacent the fused joint 15, a lateral passageway 19 provides communication with the annular zone 4 and the longitudinally extending hole 7 as best shown in Figure 2. Also, at the upper end of the lower annular zone 5 adjacent the fused joint 15, another lateral passageway 20 provides communication between the annular zone 5 and the lower portion 7' of the hole 7. The lower end of the inner quartz rod 3 has been fused to close off the lower end of the same as indicated at 21; however, this fusing of the lower end of the quartz rod 3 is done in such a manner as to permit communication between the extreme lower ends of the holes 7' and 6.

The operation of the gas soldering tool as set forth above will now be briefly described. With the leads 11 and 12 connected to a suitable source of electrical power and the rubber tube 18 connected to a source of inert gas under pressure, the gas soldering tool is ready for operation. The gas passes first through the lateral opening 17 into the upper end of the annular zone 4 and downwardly therethrough, around the outer surface of the inner quartz tube 3, until it reaches the bottom of the annular zone 4; at this point, the gas passes through the lateral opening 19 and into the hole 7; from here, the gas passes upwardly in the hole 7 to the uppermost portion of the gas soldering tool adjacent the cap 9. The gas passes from this point into the longitudinally extending hole 6 to the extreme lower end of the inner quartz tube 3; from here, the gas passes upwardly in the hole 7' through the lateral opening 20 and into the upper end of the lower annular zone 5. In the lower annular zone 5, the gaseous stream passes downwardly past the heating coil 10 and out through the lower tip 2, to be directed then as a hot stream against the material to be soldered.

Initially, the gas which passes into the opening 17 from the rubber tube 18 is relatively cool. In its transit through the gas soldering tool, by way of the various passageways therein, this gas is progressively heated although it is principally heated at the lowermost end of the soldering tool by the electrical heating coil 10. It should be apparent from the above description that the gas will absorb heat from the handle portion first, thereby causing the handle portion to be cooled relative to the lower portion thereof. Thus, in operation, the handle portion of the soldering tool is sufficiently cooled to permit the operator to hold the same during the soldering operation. Also, it should be apparent from the above description and from a consideration of the drawings that the handle portion of the gas gun—i.e., the portion above the fused joint 15—is relatively close to the lower hot portion of the soldering tool.

The gas soldering tool shown in the drawings is somewhat larger than the actual units employed in practice.

Utilizing the features shown in the drawings and described herein, it has been found that it is possible to construct an effective gas soldering tool whose actual total length is about 6 or 7 inches. Also, by selecting a quartz tube 1 and an inner quartz rod 3 of appropriate size, it is possible to construct a gas soldering tool such that the cross-sectional dimensions are slightly larger than those of an ordinary pencil. Thus, it is possible, employing the novel features of this invention, to construct a soldering tool which is extremely light and, at the same time, which is extremely easy to manipulate.

In spite of its relatively small size, the unique construction of the tool allows it to provide much hotter gas at the exit port than might be expected. This hotter gas is possible because the gas must flow past the heating coil or in close proximity thereto at least three times before emerging from the tool, i.e., down through the hole 6, up through the hole 7' and finally, down through the annular zone 5 in direct contact with the heating element. By way of example, with a gas flow of 5 cubic feet per hour and 20 volts applied to the heating coil, the hot gas temperature ¾ of an inch from the tip 2 of the tool was 775° C. With a 6 c.f.h. gas flow and with 15 volts applied to the heating coil, the temperature ¼ inch from the end of the tube was 660° C. A 260° C. temperature ¾ inch from the end of the tube resulted when 10 volts were applied to the heating coil and the gas flow was reduced to 3 c.f.h.

When high soldering temperatures, of say 700° C. or more, are required, it may be desirable to provide extra cooling action for the handle of the soldering tool. This extra cooling may be accomplished by minor changes in the construction of the tool. Thus, for hotter soldering temperatures, it may be desirable to omit the cap 9 at the top of the tool and to attach the input gas line in its place. The input gas flow is then divided with part of the gas entering the hole 6 and following from that point in the same path as previously to emerge the tip 2 as the soldering gas and part of the gas flowing through the hole 7 to function exclusively as a cooling agent. The cooling gas enters hole 7, flows downwardly to the opening 19, through which it passes to the annular zone 4. From zone 4, the gas is exhausted through the lateral opening 17 which, in the present embodiment, should be somewhat larger than in the embodiment first described.

In the embodiment of the soldering tool just described, the cooling gas flow may be regulated (and thus the amount of cooling controlled) by a valve (not shown) to regulate the flow from the opening 17. In this manner, adequate cooling may be achieved without unnecessary loss of gas.

Whereas, the instant invention has been described in particular reference to specific embodiments, it should be understood that other modifications of this invention, apart from those indicated herein, may be made within the spirit of this invention.

What is claimed is:

1. A soldering tool comprising an elongated body, one end of said body constituting a handle portion, and the opposite end of said body constituting a soldering portion, said soldering portion including an opening at the outer end thereof for permitting the issuance of a hot stream of gas from said tool, said tool being provided with passageways in each of said handle portion and said soldering portion and interconnected to permit the circulation of a stream of gas therethrough, a heating means associated with the soldering portion of said tool for heating said gas prior to its emergence from said opening, said passageways being so arranged that said gaseous stream passes first through said handle portion, whereby said handle portion is cooled relative to the soldering portion.

2. A soldering tool comprising an elongated substantially hollow body, a handle portion at one end of said body, and a gas-heating portion at the opposite end thereof, said gas-heating portion including an opening at the outer end thereof for permitting the issuance of a hot stream of gas from said tool, said tool being provided with passageways in each of said handle portion and said soldering portion and interconnected to permit the circulation of a stream of gas therethrough, a heating means associated with the gas-heating end of said tool for heating said gas prior to its emergence from said opening, and means for introducing a gaseous stream into said passageways, said gaseous stream passing first through said handle portion to provide cooling thereof relative to said gas-heating portion.

3. A gas soldering tool comprising a substantially cylindrical hollow outer member closed at the upper end thereof and being provided with a relatively narrow opening at the lower end thereof, an inner cylindrical rod concentrically arranged within said outer member and fused at the upper end thereof to the outer member, said inner and outer members being also connected at the mid-portions thereof so as to form between said inner and outer members an upper annular zone and a lower annular zone, said rod being provided with a first longitudinal passageway extending from the uppermost end of said rod to the lowermost end thereof, said rod being provided with a second longitudinal passageway extending from the upper end of said rod downwardly to a location adjacent the mid-portion of said rod, said second passageway being in open communication with the upper end of said first passageway, said rod being provided with a third passageway extending from the lower end of said rod upwardly to a location adjacent the mid-portion of said rod but ending in spaced relation with the lower end of said second passageway, said third passageway being in open communication with the lower end of said first passageway, said rod being provided with a first lateral opening connecting the lower end of said second passageway with said upper annular zone, said rod being provided with a second lateral opening connecting the upper end of said third passageway with the said lower annular zone, said outer member being provided with an upper lateral opening for permitting the introduction of a gas into said upper annular zone, a heating means situated in said lower annular zone, and means for introducing a supply of gaseous fluid under pressure into the lateral opening in said outer member, whereby said gas in passing through said tool first cools the upper portion of said tool and in passing through the lower annular zone of said tool is heated therein prior to its emergence from the lower end of said tool.

4. A gas soldering tool comprising a substantially cylindrical hollow outer member of quartz material closed at the upper end thereof and being provided with a relatively narrow opening at the lower end thereof, an inner cylindrical rod of quartz material concentrically arranged within said outer member and fused at the upper end thereof to the outer member, said inner and outer members being also fused at the mid-portions thereof so as to form between said inner and outer members an upper annular zone and a lower annular zone, said rod being provided with a first longitudinal passageway extending from the uppermost end of said rod to the lowermost end thereof, said rod being provided with a second longitudinal passageway extending from the upper end of said rod in open communication with said first passageway downwardly to a location adjacent the mid-portion of said rod, said rod being provided with a third passageway extending from the lower end of said rod in open communication with said first passageway upwardly to a location below the lower end of said second passageway, said rod being provided with a first lateral opening connecting the lower end of said second passageway with said upper annular zone, said rod being provided with a second lateral opening connecting the upper end of said third passageway with the said lower annular zone, said outer member being provided with an upper lateral opening for permitting the introduction of a gas into said upper annular zone, a heating means situated in said lower annular zone, and means for introducing a gas under pressure into the lateral opening in said outer member, whereby said gas, in passing through said tool, first cools the upper portion of said tool relative to the lower end thereof.

5. A soldering tool comprising an elongated body, one end of said body constituting a handle portion, and the opposite end of said body constituting a soldering portion, said soldering portion including an opening at the outer end thereof for permitting the issuance of a hot stream of gas from said tool, heating means associated with the soldering portion of said tool, and passageways being provided in each of said handle portion and said soldering portion to permit the circulation of gas therethrough, said passageways being so arranged that a portion of said gas is passed through the soldering portion of said tool and heated prior to its emergence from said opening and a second portion of said gas is passed through said handle portion whereby said handle portion is cooled relative to the soldering portion.

6. A soldering tool comprising an elongated substantially hollow body, a handle portion at one end of said body, and a gas heating portion at the opposite end thereof, said gas heating portion including an opening at the outer end thereof for permitting the issuance of a hot stream of gas from said tool, said handle portion including an opening near the outer end thereof for the escape of cooling gas from said tool, said tool being provided with first passageway means in each of said handle portion and said gas heating portion and interconnected to permit the circulation of a stream of gas therethrough, a heating means associated with the gas heating end of said tool for heating said stream of gas prior to its emergence from said opening at the outer end of said gas heating portion, second passageway means in said handle portion to permit the circulation of another stream of gas through said handle portion to said escape opening and provide for the cooling thereof relative to said gas heating portion, and means for introducing gaseous streams into said passageways.

7. A gas soldering tool comprising a substantially cylindrical hollow outer member provided with a relatively narrow opening at the lower end thereof, an inner cylindrical rod concentrically arranged within said outer member and fused at the upper end thereof to said outer member, said rod and outer member being also connected at the mid-portions thereof so as to form between said rod and outer member an upper annular zone and a lower annular zone, said rod being provided with a first longitudinal passageway extending from the upper most end of said rod to the lower most end thereof, said rod being provided with a second longitudinal passageway extending from the upper end of said rod downwardly to a location adjacent the mid portion of said rod, said rod being provided with a third passageway extending from the lower end of said rod upwardly to a location adjacent the mid portion of said rod but ending in spaced relation with the lower end of said second passageway, said third passageway being in open communication with the lower end of said first passageway, said rod being provided with a first lateral opening connecting the lower end of said second passageway with said upper annular zone, said rod being provided with a second lateral opening connecting the upper end of said third passageway with the said lower annular zone, said outer member being provided with an upper lateral opening for permitting the escape into the atmosphere of gas from said upper annular zone, a heating means situated in said lower annular zone, and means for introducing a supply of gaseous fluid under pressure into the upper ends of said first and second lateral passageways whereby said gas passing into said first lateral passageway passes through said third lateral passageway and thence to said lower annular zone of said tool wherein it is heated prior to its emergence from said lower end of said tool, and said gas entering said second lateral passageway passes through said upper annular zone from whence it is exhausted through said upper lateral opening thereby cooling said upper portion of said tool relative to said lower portion of said tool.

8. A gas soldering tool comprising a substantially cylindrical hollow outer member of quartz material being provided with a relatively narrow opening at the lower end thereof, an inner cylindrical rod of quartz material concentrically arranged within said outer member and fused at the upper end thereof to said outer member, said inner and outer members being also fused at the mid portions thereof so as to form between said inner and outer members an upper annular zone and a lower annular zone, said rod being provided with a first longitudinal passageway extending from the upper most end of said rod to the lower most end thereof, said rod being provided with a second longitudinal passageway extending from the upper end of said rod downwardly to a location adjacent the mid portion of said rod, said rod being provided with a third longitudinal passageway extending from the lower end of said rod in open communication with said first passageway upwardly to a location below the lower end of said second passageway, said rod being provided with a first lateral opening connecting the lower end of said second passageway with said upper annular zone, said rod being provided with a second lateral opening connecting the upper end of said third passageway with the said lower annular zone, said outer member being provided with an upper lateral opening connecting said upper annular zone with the atmosphere, a heating means situated in said lower annular zone, and means for introducing a gas under pressure into the upper ends of said first and second longitudinal passageways in said rod, whereby said gas, in passing through said second passageway cools the upper portion of said tool relative to the lower end thereof and said gas passing through said first longitudinal passageway is heated by said heating means before emerging from said relatively narrow opening at the lower end of said outer member.

References Cited in the file of this patent

UNITED STATES PATENTS

| | | |
|---|---|---|
| 1,313,861 | Reid et al. | Aug. 19, 1919 |
| 2,096,023 | Albertson | Oct. 19, 1937 |
| 2,220,545 | Reinhardt | Nov. 5, 1940 |
| 2,372,737 | Phillips | Apr. 3, 1945 |
| 2,556,609 | Arkless | June 12, 1951 |